Nov. 10, 1925.

T. FOX

POTATO DIGGER

Filed April 30, 1925

1,561,148

Tobias Fox

Patented Nov. 10, 1925.

1,561,148

UNITED STATES PATENT OFFICE.

TOBIAS FOX, OF TORONTO, ONTARIO, CANADA.

POTATO DIGGER.

Application filed April 30, 1925. Serial No. 27,027.

*To all whom it may concern:*

Be it known that I, TOBIAS FOX, a British subject, residing at 1843ª Dufferin Street, in the city of Toronto, in the county of York, and Province of Ontario, in the Dominion of Canada, having invented certain new and useful Improvements in a Potato Digger, do hereby declare that the following is a full, clear, and exact description and specification of the same.

My invention relates to improvements in a machine for digging potatoes and the objects of my invention are, first, to simplify and facilitate the digging of potatoes; second, to render the machine simple in construction with the several parts readily accessible for inspection or repair; and, third, generally to adapt the machine to better perform the functions required of it.

I attain these objects by the mechanism illustrated in the accompanying drawings, in which.

Like numerals of reference indicate various parts in the different figures.

Figure 1:
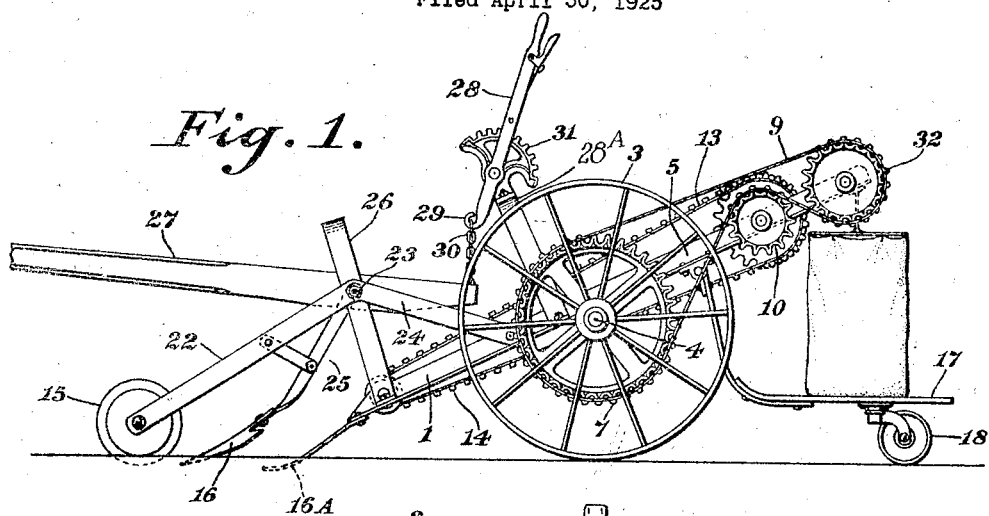
Fig. 1 is a side view of the machine complete.
Figure 2:
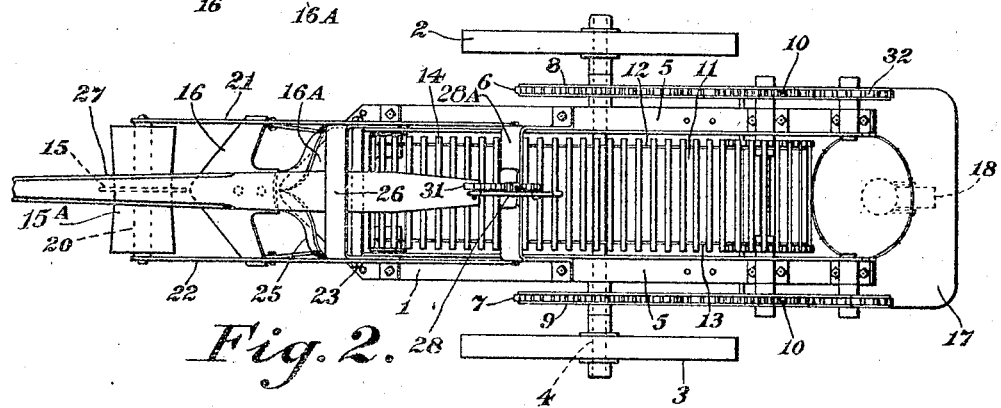
Fig. 2 is a plan view of the machine complete.
Figure 3:
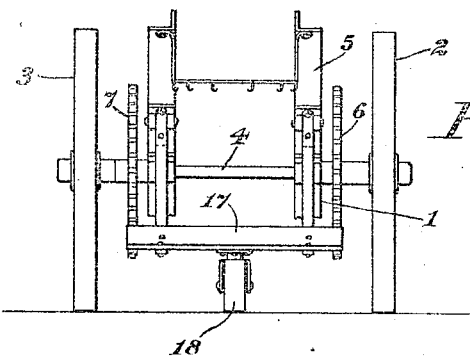
Fig. 3 is a rear view showing the truck.

Referring to the drawings, the potato digger 1 has the wheels 2 and 3 mounted on the axle 4 which is rigidly secured to the frame 5. Both the sprocket wheels 6 and 7 are mounted on the axle and grip the wheels 2 and 3 in the usual manner that is common and well known.

The sprocket wheels 6 and 7 and the idler sprocket 32 carry the sprocket chains 8 and 9 which set the driving sprocket 10 in motion and thus drive the conveyor 11 which is guided by the sprocket chains 12 and 13, said conveyor has cross pieces 14 spaced closely together so the small potatoes will drop to the ground and be left there and the large and good ones continue on up in the grading.

The cutting disc 15 is set down on the rows and cuts the sod and vines and the jointer 16 being of a pointed form will cast the sods to either side. As the digger proper 16ᴬ comes into action and gathers up the potatoes, they are forced up onto the cross pieces 14 of the conveyor 11 and continue on up until the chain starts on its downward motion and the potatoes drop into the bags which are placed on the truck 17 which is hinged to the frame 5 at one end and has the pivoted wheel 18 to support it on the ground at the other end, thus completing the bag support or truck 17.

The disc 15 and the concave gauging roller 15ᴬ are mounted on the axle 20 which is secured in the bearings arms 21 and 22, said bearing arms 21 and 22, which are substantially V-shaped, extend up at a set angle and are fastened at 23 and bent downwardly at 24 and attached to the frame 5, forming a very strong support for carrying the weight of the machine which tends to hold the disc 15 down for cutting the sods and vines.

The jointer 16 is attached to the arms 25 which are rigidly secured to the yoke 26, said yoke being rigidly secured to the frame 5.

The digger 16ᴬ is rigidly secured to the frame 5 just ahead of the yoke 26.

The tongue 27 is pivoted at 23 and is connected at its rear end to the lifting lever 28 at 29 by the chain 30. When the lever 28 is pulled down and locked in any one of the notches in the circle bracket 31 it lifts the cutting disc and the front end of the machine clear of the row, so the machine may be turned and set to come back on the next row, the lever and bracket being carried by an upright yoke 28ᴬ mounted on the frame 1.

In the operation of the invention the potato digger is set so that the circular sharp cutting edge of the disc 15 is placed in the centre of the desired row and starts cutting in when the horses pull the machine along. The rotating motion of the sharp edge cuts the sod and vines and the jointer 16 curls the sod on both sides into the ditch and the digger proper 16ᴬ picks up the potatoes that have already been uncovered and forces them up onto the conveyor 11 which elevates the large potatoes and deposits them in the bags on the truck 17, the smaller potatoes drop through the conveyor pieces 14 and are left on the ground.

The device may of course be changed to meet with the requirements of the different conditions without in any way departing from the main features as herein shown and described.

I claim:

1. The combination, in a potato digging machine, of an inclined tiltable elevator frame having a digging blade at its lower forward end, an upright yoke on the forward end of the frame, a pair of inverted V-shaped bars connected at their ends to the frame and midway of their lengths to the yokes, a concave gauging roller and cutting disc mounted on the free ends of the bars, downward inclined arms mounted on the yoke and bars, a jointer mounted on the lower end of the arms between the disc and digging blade and means to tilt the frame.

2. The combination, in a potato digging machine, of an inclined tiltable elevator frame having a digging blade on its lower end, an upright yoke on the forward end of the frame, a pair of inverted V-shaped bars connected at their rear ends to the frame and midway of their lengths to the legs of the yoke, a gauging roller mounted on the lower free ends of the bars, a tongue pivoted near its rear end to the yoke, an upright yoke to the rear of the first mentioned yoke on the frame, a lockable raising and lowering means on the rear yoke, a chain connecting the rear end of the tongue to the raising and lowering means.

TOBIAS FOX.